Patented Sept. 26, 1933

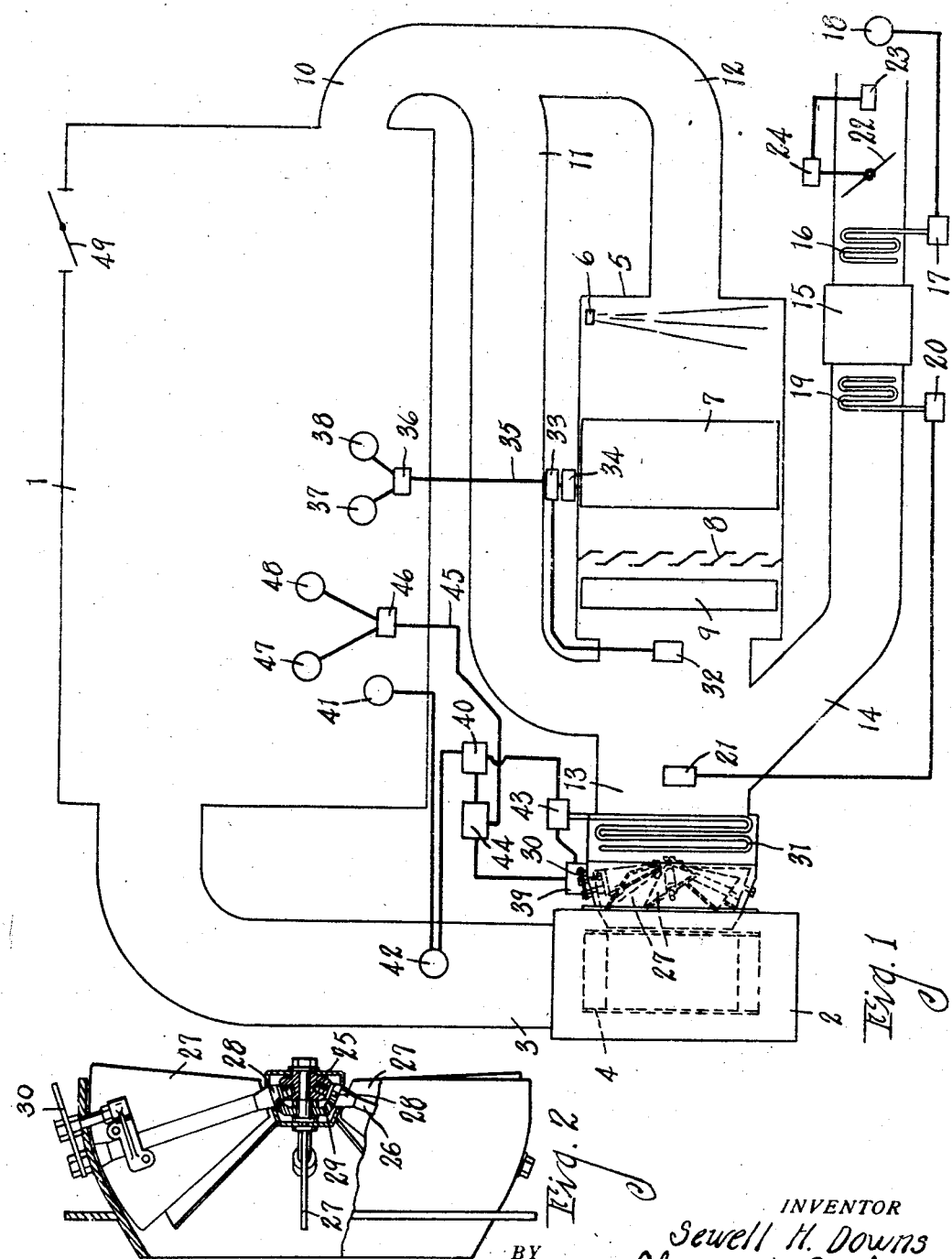

1,928,331

UNITED STATES PATENT OFFICE 1,928,331

CONDITIONING AND VENTILATING SYSTEM

Sewell H. Downs, Kalamazoo, Mich., assignor to Clarage Fan Company, Kalamazoo, Mich.

Application February 10, 1933. Serial No. 656,163

4 Claims. (Cl. 257—8)

The objects of this invention are:

First, to provide an apparatus and method for conditioning the air in a room in which a portion of air from the room is re-circulated, another portion is conditioned, and the portions are mixed together with fresh air.

Second, to provide such a system in which the amount of fresh air used is not dependent upon conditions in the room other than conditions requiring the addition of fresh air to remove odors or the like that are not removed by ordinary conditioning.

Further objects and advantages pertaining to details and economies of construction and operation will appear from the detailed description to follow. Preferred embodiments of my invention are illustrated in the accompanying drawing, in which:

Fig. 1 is a diagrammatic view of my conditioning system.

Fig. 2 is a partial sectional view of vortex control means for controlling the volume of air introduced to the room.

The parts will be identified by their numerals of reference which are the same in all the views.

1 is the room. 2 is the fan. 3 is a duct leading from the fan to the room. The fan is of the usual centrifugal type having a fan wheel 4 adapted to rotate in a counter-clockwise direction when viewed from the left of Fig. 1. 5 is a conditioner which may be of any suitable construction. The one shown has washer sprays 6, a refrigerating unit 7, eliminators 8, and a heater 9. The heater may be used or not, as desired. The refrigerating unit 7 may be of the closed coil type or the spray type and the temperature of the refrigerant used may be controlled in any suitable manner, using a three-way valve to mix cooled refrigerant with re-circulated refrigerant, or means may be used to determine the degree of cooling of the refrigerant used without re-circulating any thereof.

If a closed coil type is used, sprays may be provided or not, as desired, to spray it outside of the coils.

A duct 10 leads from the room and has a re-circulating branch 11 and a return branch 12. The recirculating branch 11 discharges near the intake 13 of the fan and the branch 12 discharges into the conditioner. An outside duct 14 is supplied having therein a filter 15 of usual design to filter fresh air taken from outside. A pre-heater 16 is supplied in the duct having a motor 17 operated by dry bulb thermostat 18 to temper the entering air. A re-heating coil 19 may be supplied having a motor 20 and dry bulb thermostat 21 located adjacent the inlet 13 of the fan to supply heat to the air, if desired. A damper 22 is supplied in the fresh air duct and may be manually operated to control the amount of fresh air admitted. If desired an outside thermostat 23 having motor 24 may be supplied to operate this damper when the temperature of the outside air has dropped to such an extent that the air from outside would have a cooling effect to eliminate the necessity of working the cooling mechanism in the conditioner 5 when the device is on summer cooling operation.

The volume control means are similar to those described in my co-pending application for vortex control, Serial No. 598,784, filed March 14, 1932. The device consists of a hub 25 supported by spider rods 26 about which are journaled sector-shaped blades 27 which have segmental gears 28 thereon meshing with a gear 29 on the hub 25. The blades are arranged to completely close off the fan or, in partially open position, to impart a swirl to the incoming air in the direction of rotation of the fan wheel 4. The blades are controlled by a lever 30 connected to one blade to rotate the same, whereby the blades are rotated in unison. This device has a special application to units of this nature because it makes it possible to use a constant speed fan and to regulate the volume delivered thereby with a high degree of efficiency in power expended, thus reducing equipment costs and giving very satisfactory operation.

The system is provided with a heating coil 31 to re-heat conditioned air during cooling if desired and to heat the air during winter operation. To control the conditioner, I provide means whereby the conditioner can be operated at a constant dew point. A dew point thermostat 32 is located adjacent the outlet of the conditioner and is connected to a two-way switch 33, thence to a motor 34 which controls the refrigerating effect of the refrigerating element 7. One branch of the two-way switch 33 is connected by connection 35 to a selective two-way switch 36 which is connected to wet bulb thermostat 37 or a humidistat 38. By this arrangement the conditioner may supply air of a constant dew point by turning the switch 33 so that the dew point thermostat 32 is in control or by turning the switch 33 to operate the motor through the connection 35. It is possible by using the selective switch 36 to control the dew point of air leaving conditioner 5 under either wet bulb conditions in the room or under the relative humidity in the room. The sensible heat in the room is controlled by the volume control means through a motor 39 which is connected to a reversing switch 40 which is in series with a controlling thermostat 41 and located in the room or in the ducts leading from the room and a thermostat 42 located in the duct 3 leading to the room. The thermostat 41 controls the opening of the volume control means and the thermostat 42 prevents air of too low a temperature passing through the duct 3 to the room.

For winter operation the reversing switch 40 can be thrown to connect motor 43 which is connected to motor 39 so that as more heat is required the volume control means opens until it is wide open. If enough heat is not supplied, the motor 43 actuates means for controlling heat in the coil 31 to add more heat to the air going to the room.

Selective two-way switch 44 is supplied in the connection between switch 40 and motor 39. This switch is connected to selectively take in the thermostat 41 or to take connection 45 which leads to a two-way switch 46 which can selectively put in control either the humidistat 47 or the wet bulb thermostat 48.

To valve out excess air, a damper 49 is provided to make room for fresh air admitted through the duct 14.

It will be seen that with my arrangement of controls it is possible to control the dew point of the conditioner and to furnish sensible heat from re-circulated air passing through the duct 11 to send a properly conditioned mixture of air to the room 1. The volume control means can be controlled by wet or dry bulb conditions in the room or by relative humidity there so that all types of conditioning can be supplied as desired.

I have shown and described my invention in the form preferred by me, but wish to claim the same broadly as well as specifically, as pointed out in the appended claims.

Having thus described my invention, what I claim as new and desire to secure by Letters Patent is:

1. In an apparatus of the class described, the combination of a room to be conditioned, an air conditioner, a constant speed centrifugal fan having a rotatable fan wheel, a re-circulation duct leading from said room to said fan, a return duct leading from said room to said conditioner, an outside duct leading from a source of unconditioned air to said fan, a duct from said conditioner to said fan, a volume control for said fan comprising a plurality of blades adapted to close off the air or in open position to impart to air entering the fan a swirl in the direction of rotation of the fan wheel, a duct from said fan to said room, a filter in said outside duct, a damper adapted to close off said outside duct, means for controlling the condition imparted by the conditioner to the air passing therethrough under control of the conditions in said room and means to control said volume control means under control of the conditions in said room comprising a thermostat.

2. In an apparatus of the class described, the combination of a room to be conditioned, an air conditioner, a constant speed centrifugal fan having a rotatable fan wheel, a re-circulation duct leading from said room to said fan, a return duct leading from said room to said conditioner, an outside duct leading from a source of unconditioned air to said fan, a duct from said conditioner to said fan, a volume control for said fan comprising a plurality of blades adapted to close off the air or in open position to impart to air entering the fan a swirl in the direction of rotation of the fan wheel, a duct from said fan to said room, a filter in said outside duct, a damper adapted to close off said outside duct, and means for controlling the condition imparted by the conditioner to the air passing therethrough, and means to control said volume control means under control of the conditions in said room.

3. In an apparatus of the class described, the combination of a room to be conditioned, an air conditioner, a fan, a re-circulation duct leading from said room to said fan, a return duct leading from said room to said conditioner, an outside duct leading from a source of unconditioned air to said fan, a duct from said conditioner to said fan, a volume control for said fan, a duct from said fan to said room, means for controlling the condition imparted by the conditioner to air passing therethrough under control of the relative humidity in the room, and means to control said volume control means comprising a thermostat in said room.

4. In an apparatus of the class described, the combination of a room to be conditioned, an air conditioner, a constant speed centrifugal fan having a rotatable fan wheel, a re-circulation duct leading from said room to said fan, a return duct leading from said room to said conditioner, an outside duct leading from a source of unconditioned air to said fan, a duct from said conditioner to said fan, a volume control for said fan comprising a plurality of blades adapted to close off the air or in open position to impart to air entering the fan a swirl in the direction of rotation of the fan wheel, a duct from said fan to said room, a damper adapted to close off said outside duct, and means for controlling the condition imparted by the conditioner to the air passing therethrough, and means to control said volume control means under control of the conditions in said room.

SEWELL H. DOWNS.